March 7, 1967  S. A. R. FLODELL  3,307,886
PIVOT BEARING FOR WINDOWS
Filed Aug. 30, 1963
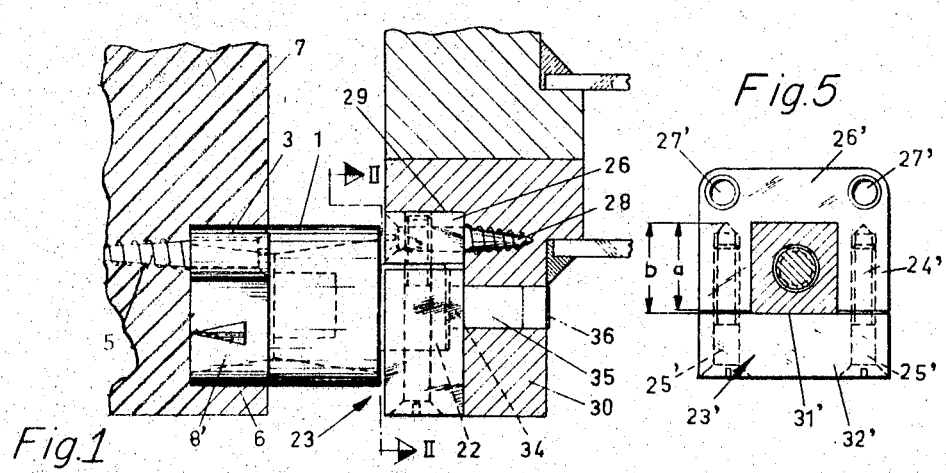
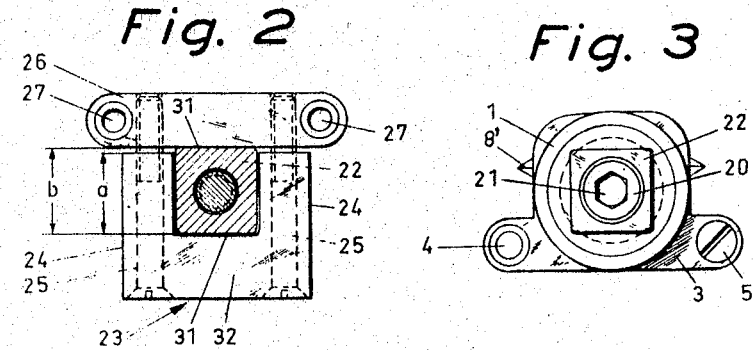
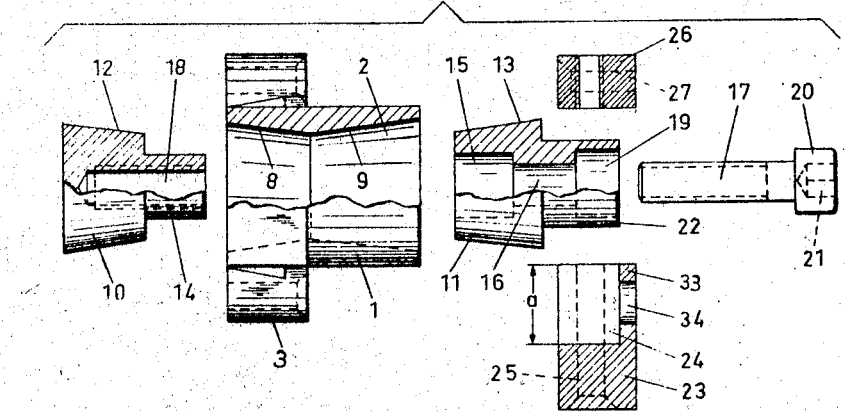

United States Patent Office 3,307,886
Patented Mar. 7, 1967

3,307,886
PIVOT BEARING FOR WINDOWS
Stig Axel Rune Flodell, Vastra Frolunda, Sweden, assignor to Karl Anders Davidson, Orkelljunga, Sweden
Filed Aug. 30, 1963, Ser. No. 305,646
2 Claims. (Cl. 308—22)

This invention has reference to pivot bearings for windows especially so-called perspective windows, doors or similar articles, of the kind comprising a bearing housing adapted to be attached to the window or other frame or the sash, and a bearing portion turnable with friction in said housing and adapted to be attached to the sash or the frame respectively, said bearing portion being provided with a spigot having a non-circular cross-section. In such pivot bearings it is important that the spigot is held and prevented from being turned relatively to the window sash or frame to which it is attached.

This object is obtained according to the invention by enclosing the spigot in a socket comprising two separable parts adapted to clamp said spigot and to be secured in the sash or frame.

In a preferred embodiment of the invention the socket is provided with a gable in front of the free end of the spigot said gable having an aperture which is coaxial with the spigot and through which a tool can be entered for adjustment of an axially arranged clamping screw in the bearing for control of the friction force between the bearing housing and the bearing portion.

An example of a pivot bearing in accordance with the invention will now be described with reference to the accompanying partly diagrammatic drawings, in which:

FIGURE 1 shows a horizontal section through a window sash and the side piece of a window frame, FIGURE 2 shows a vertical cross section on the line II—II in FIGURE 1, FIGURE 3 is an elevation of the bearing housing with the spigot, seen from the right according to FIGURE 1, FIGURE 4 is an exploded view of the bearing device, partly in section, and FIGURE 5 shows a modified embodiment of the device according to the invention.

Referring now to the drawing, the pivot bearing comprises a T-shaped bearing housing 1 with an axial bore 2, a cross stem 3 of the T having holes 4 for attachment screws 5 by which the housing is secured in a recess 6 in one of the side pieces 7 of a window frame. In order to obtain a good fastening of the housing, the latter is provided with barbs 8', which during the mounting of the housing are forced into the wood of said side piece 7. The bore 2 comprises two frusto-conical surfaces 8, 9 which have their wider portions at the ends of the bore. The bearing further comprises two discs 10, 11 each having a frusto-conical mantle surface 12, 13, respectively, which fit the two bore surfaces 8 and 9, respectively. The disc 10 is on its smaller end provided with a spigot 14 of non-circular cross-section which is insertable in a correspondingly shaped axial opening 15 in the smaller end of the disc 11. Further, the disc 11 is provided with an axial continuous bore 16 for a clamping screw 17 to be screwed into an axial opening 18 in the spigot 14 on the disc 10, said opening 18 being provided with internal threads. The bore 16 has at its outer end a larger diameter portion 19 for housing the head 20 of the screw 17, said head 20 having a hexagonal opening 21 for a tool to be used for the tightening of the screw.

The disc 11 is at its larger end provided with a square spigot 22. In mounted postion, the spigot 22 is enclosed by a U-shaped socket part 23 the branches 24 of which are passed through by screws 25. The latter can be screwed into a second socket part 26 having at its ends transverse holes 27 for attachment screws 28 which attach the part 26 to the inner end of a recess 29 in the window sash 30. The socket 23 is dimensioned so that the length $a$ of the branches 24 is somewhat less than the thickness $b$ of the spigot, measured between parallel surfaces 31. At the tightening of the screws 25 the bridge 32 of the U-shaped socket part 23 will thus clamp the spigot 22 firmly against the other part 26.

As shown in FIGURES 1 and 4, the socket 23 is provided on one side with a gable 33 having an opening 34 in front of the hexagonal opening 21 in the clamping screw 17. In the window sash 30 there is arranged coaxially with the opening 34 a channel 35 through which a tool can be inserted for turning the clamping screw 17. The channel is preferably closed by means of a plug 36, e.g. of plastic. After the adjustment of the friction force between the discs 10, 11 and the bearing housing 1 by tightening the clamping screw 17 there is as a rule no need of any further adjustment. However, in case such an adjustment should be necessary the screw head 20 will be easily accessible upon removal of the plug 36.

The mounting of the bearing is very simple. The bearing housing 1 with the discs 10, 11 and the clamping screw 17 are arranged as a unit in the window frame where it can be attached to the side piece 7 by means of the screws 5. The part 26 is secured in the recess 29 in the window sash 30 by means of the screws 28. The window sash 30 is thereby hung on the spigot 22—it will be appreciated that two coaxial bearings must be used for a horizontally pivoted perspective window with one journalling device in each side piece 7 of the window frame. Thereupon, the socket parts 23 are mounted on the spigots 22 and the latter are clamped against the parts 26 by means of the screws 25.

The bearings are conveniently produced with bearing housing 1, the discs 10 and 11 and the clamping screw 17 assembled as a unit. The friction force is preferably adjusted by means of a suitable implement and there will in such a case normally be no need of an adjustment after the mounting of the window.

It is advisable to arrange a felt ring saturated with a lubricant between the discs 10 and 11 for obtaining an effective lubrication of the surfaces 8, 9, 12 and 13.

After many years hard use of the window there might be required an adjustment of the friction force and such an adjustment is—as obvious from above—possible without loosening or removal of any portion of the bearing.

In the embodiment shown in FIG. 5, the branches 24' extend from the piece 26' instead of from the socket 23 as in FIG. 2. In the embodiment according to FIG. 5, the screws 25' can be shaped with less length than in the embodiment according to FIG. 2. For the rest, the details correspond to the details shown in FIG. 5 and have been denoted with the same reference letters as in FIG. 2 but provided with a prime sign.

The present invention has been described in detail above for purposes of illustration only and is not intended to be limited by this description or otherwise except as defined in the appended claims. The bearing can be constructively modified in many ways and thus the bearing housing 1 can be attached to the side piece 7 in other ways than the one shown in FIGURE 1. The discs 10, 11 can be pressed against each other with suitable clamping means other than the clamping screw 17. Instead of the way shown the bearing housing 1 may be arranged in the window sash 30 and the socket 23 with the part 26 in the frame side piece 7. The bearing can of course be used also on vertically pivoted windows. The spigot 22 is square in the drawing but could of course have any other suitable non-circular cross-section.

What I claim is:

1. A pivot bearing for a closure pivotally mounted in an upright frame comprising a bearing housing adapted to be mounted on the frame, bearing means adapted to be mounted on the closure and one of its ends being adapted to be received in the bearing housing and the other of its ends constituting a spigot having a non-circular cross-section, and a socket adapted to be secured to the closure, said socket comprising a U-shaped member adapted to be secured to the closure with its branches oriented downwards and a locking member extending across the free ends of the U-shaped member, the U-shaped member being provided with holes therethrough extending essentially normal to the plane of its U-shape, said holes being adapted to receive screws for securing the U-shaped member to the closure, said U-shaped member having parallel internally threaded holes extending longitudinally of its branches and opening at the free ends of the branches and said locking member having parallel holes in alignment with the internally threaded holes of the U-shaped member, said spigot being of greater thickness than the length of the branches of said U-shaped member, whereby said locking member is adapted for the insertion through the holes thereof of screws, said U-shaped member is adapted to receive and engage the screws in the internally threaded holes thereof and said socket is adapted for clamping of the spigot by tightening of said screws in said internally threaded holes.

2. A pivot bearing for a closure pivotally mounted in a frame, comprising a bearing housing adapted to be mounted on the closure, bearing means adapted to be mounted on the frame and one of its ends being adapted to be received in the bearing housing and the other of its ends constituting a spigot having a non-circular cross-section, and a socket adapted to be secured to the frame, said socket comprising a U-shaped member adapted to be secured to the frame with its branches oriented downwards and a locking member extending across the free ends of the U-shaped member, the U-shaped member being provided with holes therethrough extending essentially normal to the plane of its U-shape, said holes being adapted to receive screws for securing the U-shaped member to the frame, said U-shaped member having parallel internally threaded holes extending longitudinally of its branches and opening at the free ends of the branches and said locking member having parallel holes in alignment with the internally threaded holes of the U-shaped member, said spigot being of greater thickness than the length of the branches of said U-shaped member, whereby said locking member is adapted for the insertion through the holes thereof screws, said U-shaped member is adapted to receive and engage the screws in the internally threaded holes thereof and said socket is adapted for clamping of the spigot by tightening of said screws in said internally threaded holes.

References Cited by the Examiner

UNITED STATES PATENTS 754,871   3/1904   Howland-Sherman _____ 308—74

FOREIGN PATENTS 1,317,792   1/1963   France.

MARTIN P. SCHWADRON, *Primary Examiner.*

DAVID J. WILLIAMOWSKY, *Examiner.*

R. F. HESS, *Assistant Examiner.*